United States Patent [19]
Spilker, Jr.

[11] Patent Number: 6,044,071
[45] Date of Patent: Mar. 28, 2000

[54] SIGNAL STRUCTURE FOR GLOBAL POSITIONING SYSTEMS

[75] Inventor: James J. Spilker, Jr., Woodland, Calif.

[73] Assignee: Stanford Telecommunications, Inc., Sunnyvale, Calif.

[21] Appl. No.: 08/975,156

[22] Filed: Nov. 20, 1997

Related U.S. Application Data

[60] Provisional application No. 60/058,859, Sep. 12, 1997.

[51] Int. Cl.$^7$ ..................................................... H04J 13/00
[52] U.S. Cl. ......................... 370/320; 370/342; 370/441; 370/479; 342/357; 342/463
[58] Field of Search .................................... 370/320, 342, 370/441, 479, 335, 497, 350; 342/352, 357, 358, 372, 373, 380, 383, 413, 455, 463

[56] References Cited

U.S. PATENT DOCUMENTS

| | | |
|---|---|---|
| 5,101,416 | 3/1992 | Fenton et al. ............................ 342/357 |
| 5,541,606 | 7/1996 | Lennen ..................................... 342/352 |
| 5,724,046 | 3/1998 | Martin et al. ............................ 342/357 |

*Primary Examiner*—Douglas W. Olms
*Assistant Examiner*—Shick Hom
*Attorney, Agent, or Firm*—Jim Zegeer

[57] ABSTRACT

A system for providing a signal structure for code-division multiplexed radio positioning comprises a coherent signal source from which carrier frequency and all lower frequencies used in code definition are derived through frequency synthesis. A radio frequency (RF) carrier approximately centered in the available band is provided. Binary phase shift modulation of the RF carrier by a composite signal made up of: (a) a first coded signal whose code is publicly known having a short repeat interval, whose spectral content lies within the center portion of the avaILABLE BAND AND (b) a second coded signal having a much longer repeat-interval composed of repetitions of a multibit symbol repeated in direct or inverted form according to the values of a second coded signal, not publicly released whose repeat interval is much longer than that of the first coded signal, wherein the multi-bit symbol has an odd number of bits (chips) with equal numbers of binary 0 and 1 bit values and is chosen from among all such multi-bit signals for its having low autocorrelation values with shifted versions of itself including, as part of its composite modulation signal, one or more additional coded signals used for radio positioning.

7 Claims, 5 Drawing Sheets

Simplified Block Diagram of GPS Satellite Payload

SIGNAL STRUCTURE FOR GLOBAL POSITIONING SYSTEMS

This invention is the subject of provisional application Ser. No. 60/058,859 filed Sep. 12, 1997.

BACKGROUND OF THE INVENTION

During the 1970s and 1980s, the U.S. Department of Defense developed and fielded a highly accurate, globally usable radio-positioning system. It was designed to be used for self-location of military systems on land, in the air or in low earth orbits, or on the surface of bodies of water. This system, which has been known as NAVSTAR and as GPS (Global Positioning System), is now in wide use by both military and commercial vehicles, air and spacecraft, missiles, foot soldiers, and civilians engaged in business and pleasure. Each receiver listens to signals from the visible members of a constellation of transmitter satellites launched by the U.S. Department of Defense into three approximately 11000-mile near-circular orbits around the earth. FIG. 1 (prior art) is a simplified functional diagram of the GPS satellite payload.

Application of GPS requires that a receiver receive signals from at least three different satellites and measure with great accuracy the time-differences between their signals. Then, with precise knowledge of the satellites' orbital positions and any offsets in their clock-timed signals extracted from the received signals, the receiver performs spherical-geometry computations to determine its own location with respect to the earth. Received signals from three satellites are needed to determine horizontal position on the earth's surface, while four signals will allow determination of both surface coordinates and altitude. In practice, many more satellites are required to provide service continuously over most of the earth's surface. Because the satellites orbit at about half the geo-synchronous altitude, the set of 3, 4, or more satellites used for location calculation must continually change. Accuracy depends on accurate quantum clock timers on each satellite, and on the geometry of the measurement. Maximal accuracy is obtained if three satellites are spaced 120 degrees apart on the horizon, with a fourth directly overhead, but near-maximal accuracy is obtained almost continuously within the temperate zone.

All transmitter satellites share narrow (10 MHz) allocated electromagnetic bands, centered at 1575.42 MHz and 1227.6 MHz. These are referred to as the L1 and L2 bands respectively. In order to share these bands and be separately receivable, pulse code modulation (PCM) is used. Each satellite's signals are distinguished by a separate pseudo-noise code sequence, and each is detected in a receiver by generating a corresponding code sequence in the receiver and demodulating the signal through its use. FIG. 2 (prior art) is a functional block diagram of a user system configuration with separate receivers and position estimating functions.

As shown in FIG. 1, each GPS satellite broadcasts two signals in the L1 band and one in the L2 band. The Clear/Acquisition (C/A) signal, currently broadcast only in the L1 band, repeats every millisecond, has pulse (chip) rate of 1.023 MHz, is intended for easy acquisition by receivers, and provides accuracy of 100 meters in horizontal location. The Precision (P) signal repeats weekly and has a chip rate of 10.23 MHz, providing basic horizontal accuracy of about 30 meters. Accuracy can be improved by extended measurements. The entire satellite constellation thus operates using code-division multiple access (CDMA) to enable separation of signals from all satellites.

Receivers are, with the exception of necessary radio-frequency elements, largely comprised of digital computers. Proper use of multiple computers permits simultaneity of performance of some of the many necessary computation functions, and generally improves dynamic accuracy.

Because of the electrically charged ionosphere surrounding the earth—well below the altitude of the GPS satellites—the travel time of electromagnetic waves reaching earth-based receivers is slightly altered from that assuming free-space paths. Correcting this small error is required only for certain military applications, and provided for in GPS by transmitting a simultaneous P signal on the L2 carrier.

The designers of GPS provided the C/A signal for two purposes: to enable acquisition of the more precise P signal by military receivers, and also for an "in the clear" low-accuracy signal for civilian use. The P signal could, according to that design concept, be replaced in times of national emergency by a similar but differently coded Y signal known only to friendly military. Military receivers would be able to acquire the P/Y signal without the help of the C/A signal. However, since no provision was made for disabling the C/A signal, a potential enemy could use it in wartime. With the original signal design, jamming would affect both C/A and Y signals and would not only deny the C/A signal to hostiles but would also deny the Y signal—and use of GPS—to friendly forces.

For a more detailed discussion of GPS see the text "Global Positioning System: Theory and Applications—Volume 1", B. W. Parkinson and J. J. Spilker, Jr., PROGRESS IN ASTRONAUTICS AND AERONAUTICS, Vol. 163, 1996.

PRINCIPLES AND OBJECTIVES OF THE INVENTION

The objective of the invention is to provide an improved version of the GPS signal structure that at minimum provides the following capabilities: to provide a civil signal in the L2 frequency band; to provide the US military a means for denying that civil L2 signal capability in areas of regional conflict where the GPS signal can be used by an enemy. The denial would be provided by jamming the C/A signal; and to provide a new military signal, herein called the M signal, which can operate successfully in the presence of such jamming.

It is also desirable to examine some of the constraints of the existing GPS satellites, in the acquisition groups known as Blocks 2F and 2R. Both were designed to operate with constant envelope digital phase modulation, e.g., BPSK (Binary Phase Shift Keyed) or QPSK (Quadrature Phase Shift Keyed) modulation; the QPSK Inphase and Quadrature channels support different power levels, with C/A and P signals respectively on the Inphase and Quadrature Channels. The Block 2R satellites have only BPSK modulators. The Block 2F satellites have the same QPSK modulator on L2 that they have on L1.

Desired characteristics of the new M code

An object of the invention is to provide a modified L2 GPS channel which comprises three signals: the present P/Y code at 10.23 MHz, a C/A signal at 1.023 MHz, and a new military code which is herein termed M code or signal. The key objectives for the M signal are:

1. The signal must reside within the 20 MHz spectral allocation for L2. Thus the clock rate must not exceed 10.23 MHz; we assume here a 10.23 MHz clock.

2. The signal must have a spectral null in the center of the C/A spectrum, so that during a regional conflict the C/A signal can be denied to the enemy by jammers effective locally in the region, while it continues to be available elsewhere. This requirement is met if the M code spectrum has a null at center frequency.

3. The M signal must have good acquisition and tracking properties so that it provides good navigation. To have good acquisition properties, the M signal must have low autocorrelation sidelobes, to reduce the probability of false lock in the presence of multipath propagation and ionospheric propagation delay. The L2 military signal can be acquired directly without use of the C/A signal, however there is still a delay uncertainty even in the best circumstances, because of the unknown ionospheric delay (which can be on the order of 150 ns.), or multipath delays.

4. The M signal must be resistant to jamming and have transmission security so that it is not available to an enemy. Jamming resistance must include resistance to repeat jamming; hence there must be no signal structure frame longer than one C/A code chip interval (1/1.023 microseconds).

DESCRIPTION OF THE DRAWINGS

The above and other objects, advantages and features of the invention will become more clear in light of the following specification and accompanying drawings, wherein.

DETAILED DESCRIPTION OF THE INVENTION

Figure 1:
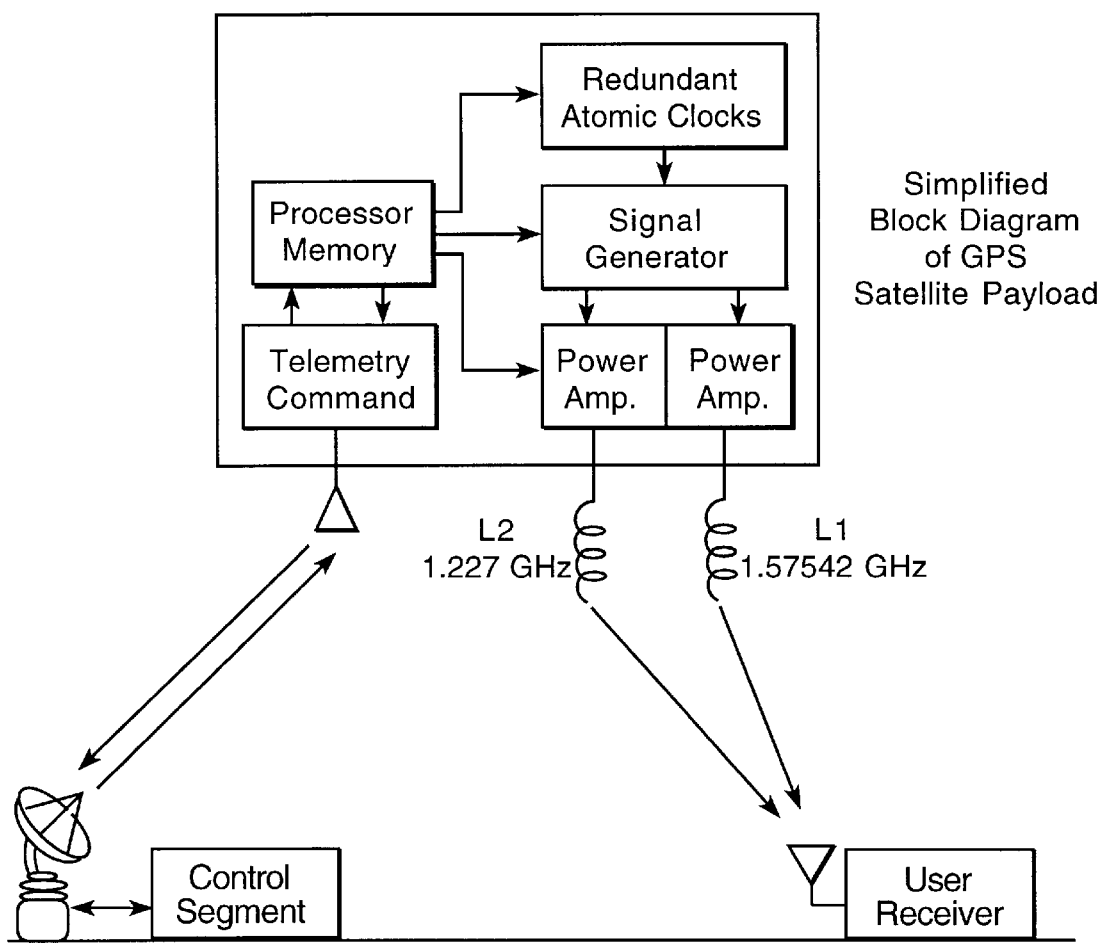
FIG. 1 is a simplified GPS satellite payload functional diagram.
Figure 2:
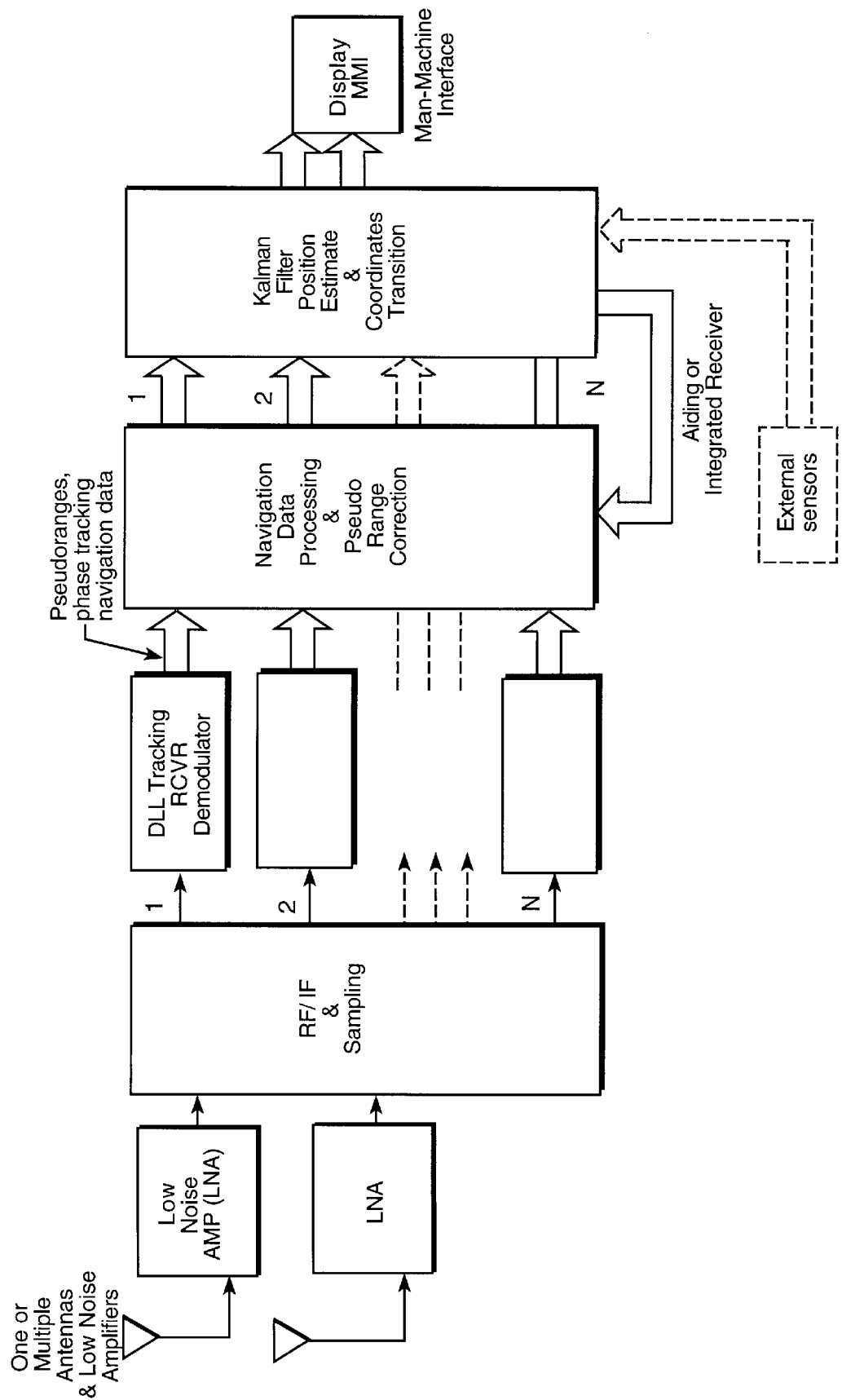
FIG. 2 illustrates a generalized GPS user system configuration with separate receiver and position estimating functions.
Figure 3:
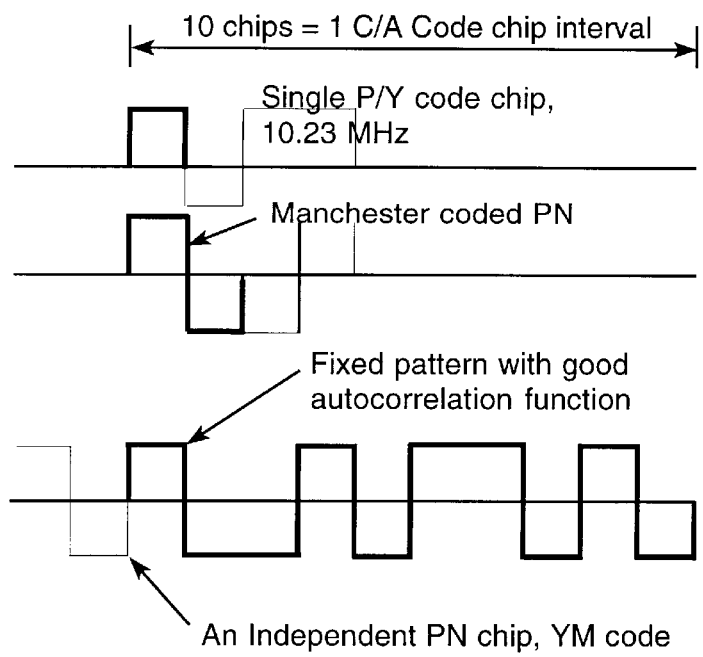
FIG. 3 illustrates alternative signals with chip rates equal to the P code chip rate of 10.23 MHz; in order to achieve a null in the power spectral density at the center frequency the code pattern must be balanced with a guaranteed equal number of ones and zeros, =/−1s.

In evolving a code having a null in the center of its spectrum, an immediate possibility (suggested elsewhere for this application) is to evolve the code by superposing two-chip symbols (FIG. 3), using the long-repeat pseudonoise P code to set the polarity of the first half of each symbol. For this Manchester-coded signal, P-code chips are generated at half rate, namely 5.115 MHz, and each P code chip is converted to a pulse doublet. Each pulse doublet has zero average value; therefore the resulting signal will have a spectral null at center frequency.

If jamming were received at this same center frequency, it would be largely attenuated within the detector because of this spectral null, resulting in better performance (by 40 dB or more) than that of a P code receiver exposed to the same jamming. Since C/A codes, which are available to any potential enemy, can be effectively jammed by relatively narrow-band jamming, we could jam the C/A signals while receivers adapted to the M code would be largely immune to the regional narrow band jamming. Hence, selected or enemy GPS receivers in a given geographical region could be rendered ineffective while properly adapted receivers (such as military) remained operative.

However, this Manchester coded signal has a significant problem, for its autocorrelation function has very high side lobes, hence acquisition of this signal in the presence of noise, multipath, and ionospheric delay could be quite difficult. As is well known, the P code signal has a single autocorrelation peak and no sidelobes, while the sidelobes of the C/A signal, though not zero, are small also.

Figure 4:
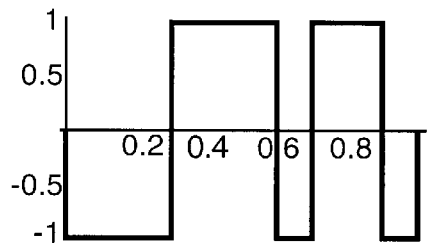
FIG. 4 illustrates a 10 bit code, M[t], with low correlation sidelobes.

An alternative to the simple pulse doublet of the Manchester coded signal is to use as a primitive symbol a longer pulse sequence which is also exactly balanced in its numbers of zeros and ones, but which is more pseudorandom in appearance, and with smaller autocorrelation sidelobes. The longest such sequence of interest to us is 10 chips in duration, as shown in FIG. 4. Thus this 10-chip symbol is the same length as a C/A code chip, and will be synchronized with the C/A code. Each successive 10-bit pattern is inverted or not inverted in sign, depending on the sign of a secure YM code chip whose chip rate will be 1.023 MHz.

The next step is to determine which 10 chip code—among those exactly balanced in numbers of ones and zeros (5 of each)—has the best autocorrelation function, in terms of lowest autocorrelation sidelobes. Note that for this purpose, codes that are simply sign inverses of one another are in effect the same code.

Figure 5:
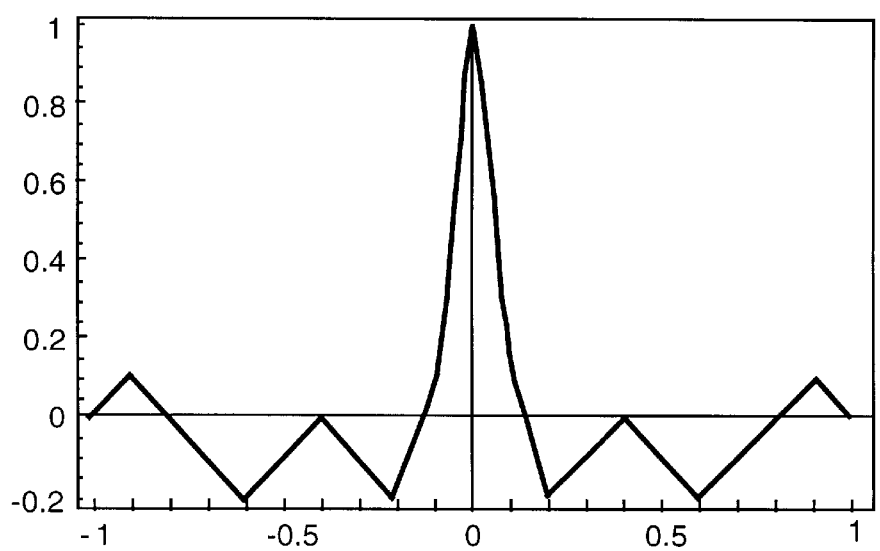
FIG. 5 illustrates the autocorrelation function of the military code, XZ[t], as proposed herein.

It is an easy task to search the 126 balanced 10 bit codes for the lowest autocorrelation sidelobes. There are two codes with good autocorrelation functions, namely, (−1,−1,−1,+1,+1,+1,−1,+1,+1,−1) and the time inverse of this code. FIGS. 4 and 5 show the time sequence of this code and its autocorrelation function. The autocorrelation function of this code and its time inverse have worst-case sidelobe of −0.2 compared to the peak of 1.0. All of the other 125 balanced codes have sidelobes of amplitude 0.3 or more.

Figure 6:
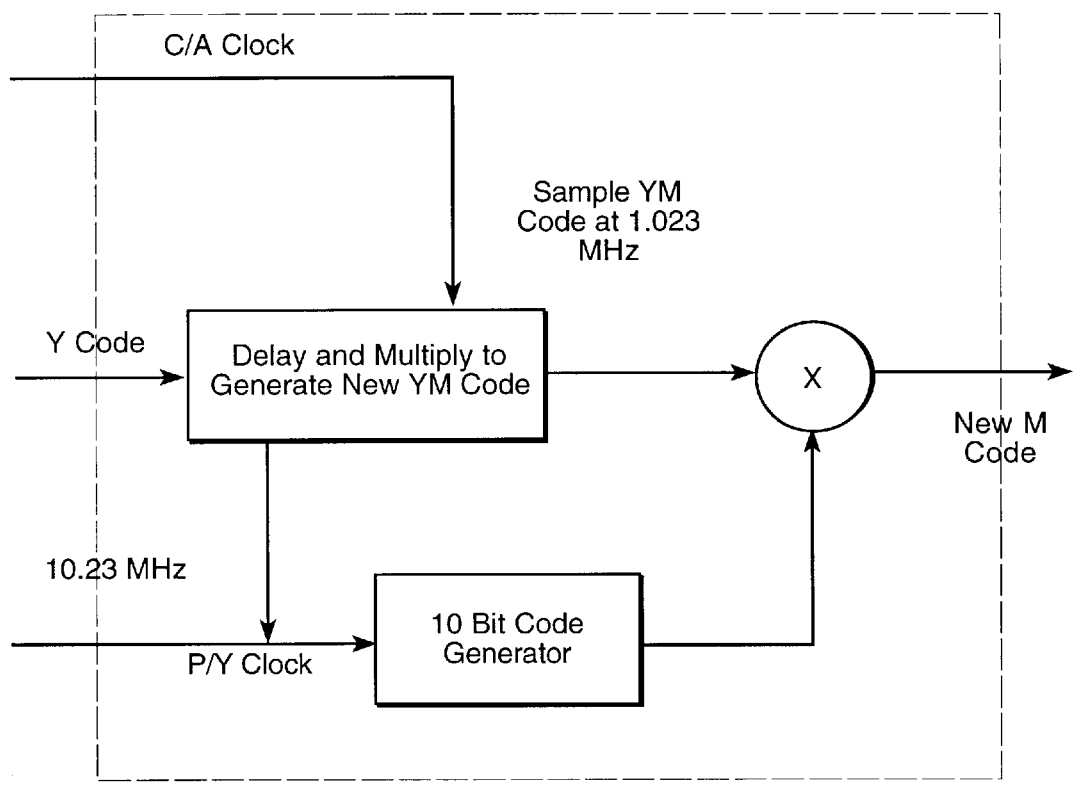
FIG. 6 is a simplified block diagram of the new M code generator; the YM code is generated by Mod 2 adding original and delayed versions of the existing Y code; this YM code then determines the sign of the 10 bit code generator which is clocked at 10.23 MHz.

The M signal can be implemented very easily from the Y code and the C/A code clock as shown in FIG. 6. The YM code is generated by Modulo 2 adding original and delayed versions of the Y code as generated by existing GPS satellites. This YM code then determines the sign to be applied by the 10 bit code generator which is clocked at 10.23 MHz. There are no new complex code generators required in generation of the M code, and the secure YM code is generated from two essentially independent samples of the Y code which are Mod 2 added or Multiplied. The delay separation might, for example, be on the order of 50 bits. The output of the Mod 2 adder is then sampled at a 1.023 MHz rate to generate the YM code. It will be understood that, if the M code were being generated for use in a newly designed radio-location system, a more direct generation of the secure YM code could slightly simplify the circuits.

Figure 7:
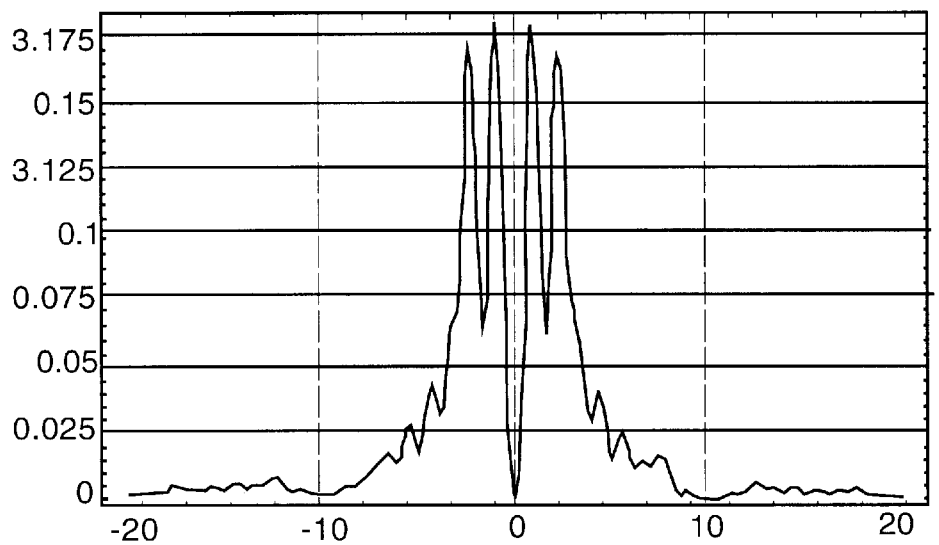
FIG. 7 illustrates the power spectral density of the new M signal; note that the power spectrum has nulls at both the center frequency and at 10.23 MHz offset.
Figure 8:
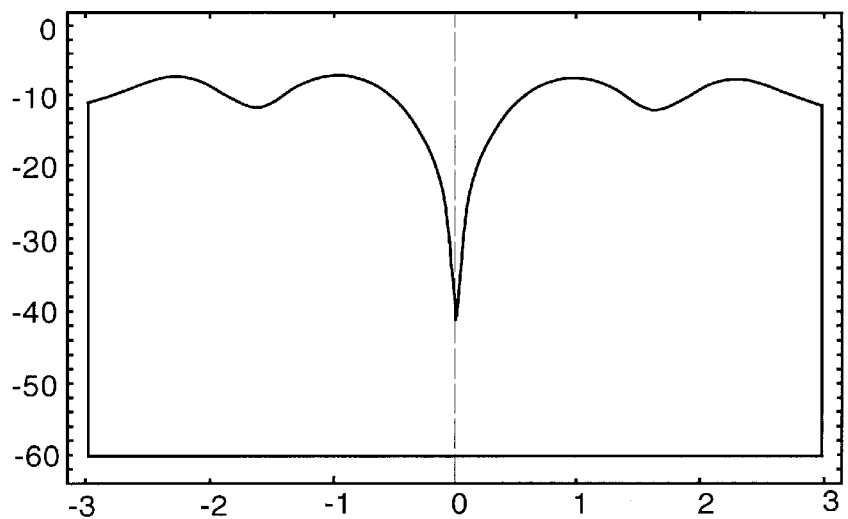
FIG. 8 illustrates the power spectral density plot with a dB scale for the center 6 MHz.

Since the successive blocks of 10 bit samples of the new M code are essentially independent, the sign of successive blocks being governed by the YM code, therefore the power spectral density is that of the 10 bit sequence shown in FIG. 5, and is as shown in FIG. 7.

Another useful measure of the signal spectrum is the Gabor bandwidth[1], a measure of the mean square timing accuracy. The Gabor bandwidth is:

$$f_g = \sqrt{\overline{f^2}} = \sqrt{\int_0^{10^7} f^2 G[f] df}$$

where we have assumed that the available frequency spectrum extends only to 10 MHz. The Gabor bandwidth for these three signals is:

New M code 2.135 MHz
Manchester 2.756
P code 1.592

[1]. See J. J. Spilker, Jr. "Fundamentals of Signal Tracking Theory", in B. W. Parkinson and J. J. Spilker, Jr. GPS, Theory and Application, AIAA. Washington. D.C. 1996

The Manchester coded signal has the largest, and best, Gabor bandwidth. However the proposed M code has a Gabor bandwidth significantly larger than that of the P code, hence can have better timing accuracy than the P code.

Note in FIG. 7 that the main lobe of the C/A spectrum is well above the spectra density of the proposed M code. Thus it is expected that C/A code receivers could operate well when there is no jamming even if the M signal is significantly higher in power than the C/A signal.

Combination of M, C/A and P/Y codes as L2 modulation

In this invention, the three binary coded signals are combined in a Majority Vote Combiner, to obtain a composite binary pseudo-random code which we label XM.

This majority vote signal has been used for years in other applications[2] as a means of combining odd numbers of different binary PN sequences. The key feature is that this particular Majority vote composite binary signal provides maximum cross-correlation with each of the separate sequences, and is optimum in that sense.

[2]. (See J. J. Spilker, Jr., Digital Communications By Satellite, Prentice Hall, 1977,1995, p. 600–603)

In quantitative terms, the total useful power in the composite signal is only 1.25 dB below the total power transmitted. A time-multiplexing scheme for combining the three codes would devote ⅓ of the PN chips to each modulation source and decrease the maximum correlated signal amplitude by a factor of 3, a much larger degradation than is available using the Majority combiner. This assumes that the receiver does not time-gate noise; in this type of receiver, time gating on individual P code chips is not believed to be practical.

The particular majority code combiner used can be implemented with minimal impact on the L2 signal generator, no impact at all on the binary phase modulator and none on the L2 amplifier.

The majority vote combiner has as its input three synchronous pulse trains: the C/A code at 1.023 MHz, the P code at 10.23 MHz, and the M code derived as described earlier. The output of the combiner is 1 whenever two or more of the three inputs is one and −1 whenever two or more of the three inputs are −1.

An important feature of this binary composite code is that it is optimal in that it has maximum cross-correlation with each of the individual subsequences. That is to say, receivers can be built that correlate the biphase modulated received signal with each of the subsequences individually, and maximum receiver cross-correlation is assured with each of the three—as compared to any other binary sequence.

When demodulating the Majority Combiner's composite signal, a correlation receiver will produce an output of ½ the amplitude (i.e., ¼ the power) from each component, as compared to the output obtained if only a single code modulated the carrier. If three independent signals were combined linearly by addition, with the same total power the output power from each correlator would be ⅓ of the input, hence the penalty to obtain a constant envelope binary phase modulated composite signal is only (⅓)/(¼) or 1.25 db.

Receiver Implementation for Majority-Combined Composite Code

Figure 9:
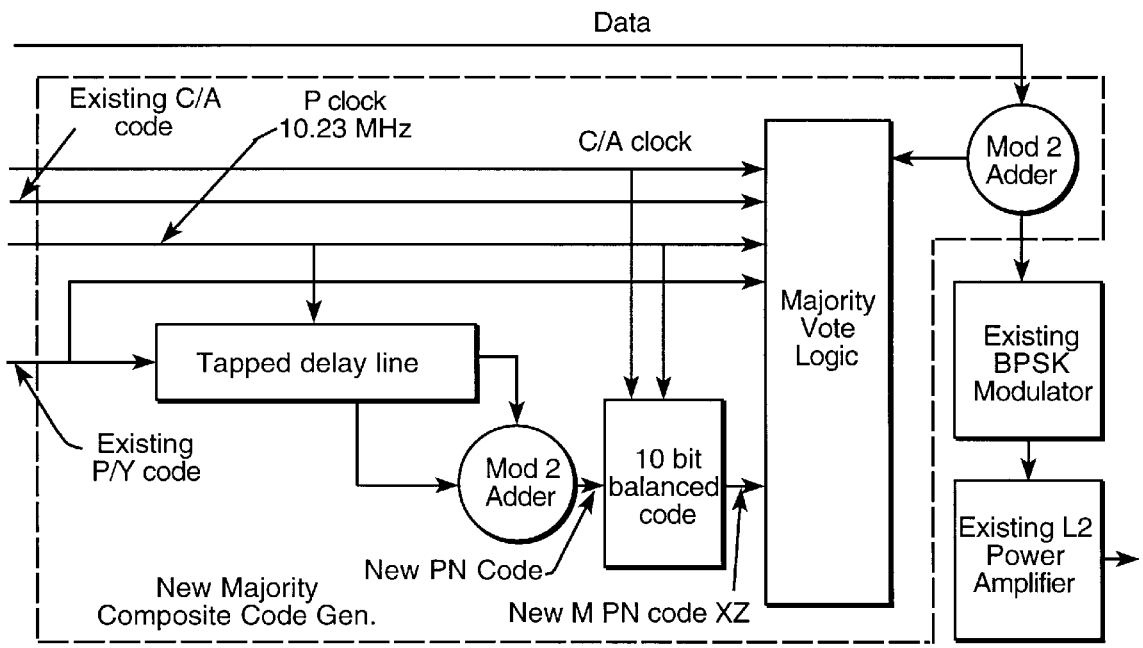
FIG. 9 is a simplified block diagram of the L2 code generator, modulator, power amplifier. The existing P/Y code, C/A code, data, and clock enter at left.

The majority vote composite code and the new military M coded PN signal can be easily implemented using simple logic, as shown in FIG. 9. FIG. 9 is a Simplified block diagram of the L2 code generator, modulator, power amplifier. The existing P/Y code, C/A code, data, and clock enter at left.

The tapped delay line (with possible addition of nonlinear double balanced logic if multiple tap inputs are employed) provides the new code based on the P or Y code. If the P code were a linear maximal-length sequence, this operation would produce give a delayed version of the same P code. However, this is not the case.

This new code is then clocked at the C/A chip rate, 1.023 Mcps, and used to set the signs of a series of 10-bit sequences, resulting in a 10.23 Mcps signal. The three codes are majority-logic combined, and the output is then Mod 2 added to data at 50 bits/sec. If required, each of the three signals could be modulated with separate 50 bps data streams prior to the majority combiner.

Finally the composite code is fed to the BPSK modulator and L2 power amplifier as are employed in the existing satellites which have only PN code modulation. In order to improve the performance of the system (as regards acquisition time and positioning accuracy) the output of the power amplifier could be increased by a factor of 3 or more. Since existing power amplifiers are operated in the saturated mode, operation is efficient.

Power level control for the Military M signal

There are several ways in which the power in the secure M signal can be increased. If a quadrature-phase modulator is available for the L2 band (as true on some of the existing satellites), the M signal alone can be used in the Quadrature channel, with the majority-combined signal applied to the Inphase channel. Alternatively, pseudo-randomly sequenced time gating of the signals to the majority vote combiner can be used, so that the M signal alone is outputted, say, 50% of the time, in which case the output power in the M signal is of the order of 0.5×0.25+0.5=0.625 of the total output, and that in the C/A and P or Y signals is 0.125 each.

Advantages over the existing system

As previously stated, this invention permits regional jamming of the GPS civil (C/A) signal without materially affecting the new military M precision-navigation signal, and provides improved signal acquisition of the M signal, as compared to the existing P (or Y) signals.

While the invention has been described in relation to preferred embodiments of the invention, it will be appreciated that other embodiments, adaptations and modifications of the invention will be readily apparent to those skilled in the art.

What is claim is:

1. A system for providing a signal structure for code-division multiplexed radio positioning comprising:

means for providing an available radio frequency band for signal transmission, a coherent signal source from which carrier frequency and all lower frequencies used in code definition are derived through frequency synthesis, means for providing a radio frequency carrier approximately centered in the available band, means providing binary phase shift modulation of said carrier frequency by a composite signal made up of:
(a) a first coded signal whose code is publicly known having a short repeat interval, whose spectral content lies within the center portion of said available band and
(b) a second coded signal having a much longer repeat-interval composed of repetitions of said multi-bit symbol repeated in direct or inverted form according to the values of said second coded signal, not publicly released, whose repeat interval is much longer than that of said first coded signal, wherein said multi-bit symbol has an odd number of chips with equal numbers of binary 0 and 1 bit values, and is chosen from among all such multi-bit signals for its having low autocorrelation values with shifted versions of itself.

2. The signal structure as defined in claim 1, including, as part of its composite modulating signal, one or more additional coded signals used for radio positioning.

3. The signal structure as defined in claim 2, wherein the number of coded signals in said composite modulating signal is said odd number, and combination of the coded signals into a single binary phase-modulation signal is by Majority Vote combination, in which the modulation signal's binary value is 1 whenever a majority of the combined signals have values of 1, or is 0 otherwise.

4. The signal structure as defined in claim 1, wherein said multi-bit symbol is 0,0,0,1,1,1,0,1,1,0 or its time-reverse equivalent, 0,1,1,0,1,1,1,0,0,0.

5. The signal structure as defined in claim 2, wherein said multi-bit symbol is 0,0,0,1,1,1,0,1,1,0 or its time-reverse equivalent, 0,1,1,0,1,1,1,0,0,0.

6. The signal structure as defined in claim 3, wherein said multi-bit symbol is 0,0,0,1,1,1,0,1,1,0 or its time-reversed equivalent, 0,1,1,0,1,1,1,0,0,0.

7. A code-division multiplex receiver for said composite modulating signal defined in claim 6, comprising:

a high-frequency amplifier and translator to translate said composite modulating signal to an intermediate frequency, a coherent detector and sampling circuit generating in-phase and quadrature data streams representing said composite modulating signal and any noise added during transmission and reception, local code generators producing time-shifted representations of one or more of the separate codes known to be present in the composite modulating signal, one or more binary correlators, each binary correlation using as inputs the sampled received composite modulating signal and one of the coded signals in said composite modulating signal, and one or more phase-locked loops connected to said one or more binary correlators for tracking said received composite modulating signal based on outputs of said one or more binary correlators.

* * * * *